No. 832,908. PATENTED OCT. 9, 1906.
H. H. HAWLEY.
NUT LOCK.
APPLICATION FILED MAY 2, 1906.
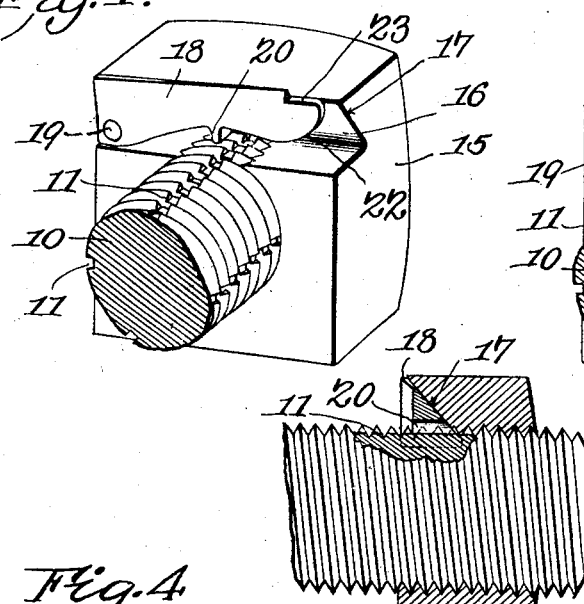
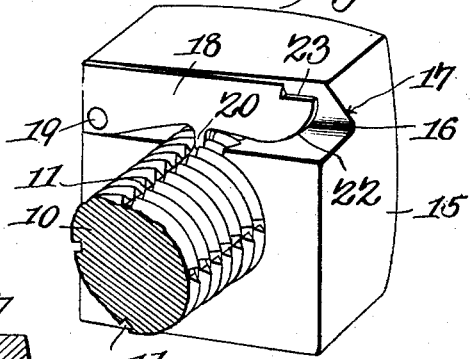
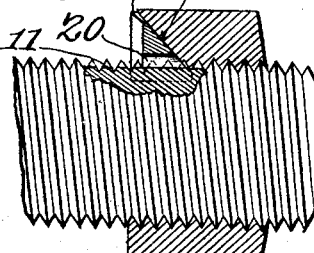
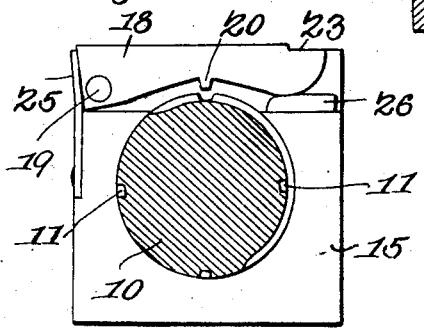
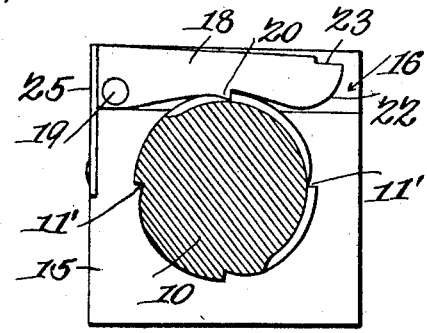
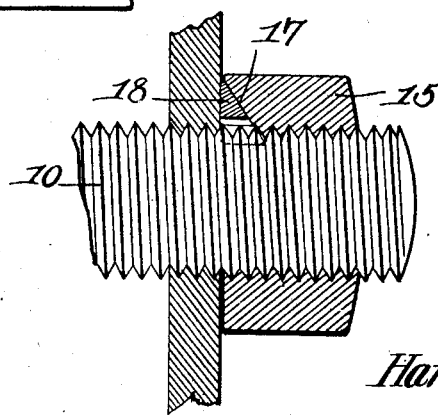
WITNESSES:
Harry H. Hawley
INVENTOR
By
ATTORNEYS

UNITED STATES PATENT OFFICE.

HARRY H. HAWLEY, OF MALONE, NEW YORK.

NUT-LOCK.

No. 832,908.     Specification of Letters Patent.     Patented Oct. 9, 1906.

Application filed May 2, 1906. Serial No. 314,895.

*To all whom it may concern:*

Be it known that I, HARRY H. HAWLEY, a citizen of the United States, residing at Malone, in the county of Franklin and State of New York, have invented a new and useful Nut-Lock, of which the following is a specification.

This invention relates to nut-locks, and has for its principal object to provide a locking device of simple construction which may be readily moved into and from engagement with the bolt and permit backing off of the nut without injury to the bolt.

A further object of the invention is to provide a locking member that is pivotally connected to the nut and is so arranged as not to interfere with the turning of the nut by ordinary wrenches or similar tools.

A still further object of the invention is to provide a nut-locking member that is arranged within a cavity or pocket in the nut and is protected to such an extent as to lessen the danger of rusting and deterioration, so that it may be readily moved to release position at any time it becomes necessary to remove the nut.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a perspective view illustrating a portion of a bolt and a nut provided with a locking device constructed in accordance with the invention, the locking device being shown in release position. Fig. 2 is a similar view in locking position. Fig. 3 is a transverse sectional view through the nut and the locking device. Fig. 4 is an elevation of the nut, the bolt being shown in section, illustrating a slightly-modified construction in which a spring is employed to move the locking device to bolt-engaging position. Fig. 5 is a similar view showing the bolt provided with grooves in the form of ratchet-teeth. Fig. 6 is a vertical section similar to Fig. 3 and illustrating a further modification.

Similar numerals of reference are employed to indicate corresponding parts throughout the several figures of the drawings.

In carrying out the invention the bolt 10 is provided with one or more longitudinal grooves 11, that preferably extend parallel with the longitudinal axis of the bolt, and while these grooves are preferably provided with straight walls or shoulders they may in some cases be of the character shown at 11' in Fig. 5, where one wall is rounded or tapered.

The nut 15 is provided with a recess 16, that extends across its inner face near one edge and in a position to cross a portion of the female thread. This recess has an angular wall 17, that is approximately at an angle of forty-five degrees to the plane of the inner face of the nut, and within this recess is arranged a pivoted locking-tongue 18, having an angular wall or side corresponding to the angular face of the recess, as shown more clearly in Fig. 3. This locking-tongue is pivoted on a pin 19 near one side of the nut and is provided with a pendent lug or finger 20, that is arranged to enter one or other of the locking-grooves 11. The free end of the tongue has a rounded lower edge 22, and in its upper face is a recess 23, the latter being made for the purpose of permitting the use of a pointed tool for moving the tongue 18 to locking position, while the rounded lower face may be acted upon by a similar tool in forcing the tongue to release position.

The pivotal connection of the tongue is stiff or rigid to such an extent that the tongue will remain in the position illustrated in Fig. 1 while the nut is being turned to the desired position. When this position is reached, a suitable tool acting on the wall of the recess 23 is employed to force the tongue inward and move the lug or finger 20 into one of the grooves of the bolt, and the parts will remain in this position until a tool is entered below the rounded face 23 and the tongue is forced to release position.

It is evident that the pivot may be loose, and in some cases a spring 25 may be utilized for urging the tongue to locking position. This construction is illustrated in Fig. 4, and in such cases it is usual to introduce a small block 26 below the free end of the tongue in order to hold the latter in release position while the nut is being turned home. Afterward the block may be removed and the tongue allowed to move to locking position.

In the construction illustrated in Fig. 5 the locking-grooves are provided each with one rounded or tapered wall after the fashion of ratchet-teeth, so that the block 26 will not be necessary while the nut is being turned home, and it is only necessary to employ the block when it is desired to pull the tongue outward during the removal of the nut.

The inclined faces of the recess and the locking-tongue may be utilized to advantage in effecting a self-locking operation when the nut is turned to a position against a fish-plate or other object, and in such cases the outer face of the tongue is arranged to project slightly beyond the inner face of the nut, as shown in Fig. 6, so that the tongue will first engage with the fish-plate and then during a final quarter or half rotative movement of the nut the tongue will be forced positively down into engagement with the bolt and will clamp against the same to such an extent as to prevent loosening of the nut under any ordinary conditions of use.

I claim—

1. In combination, a nut having a transversely-extending recess formed in its inner face and extending across the plane of the threaded opening, said recess having an obliquely-disposed wall that extends from the juncture of the inner face of the nut and one of its wrench-engaging faces, and a pivoted bolt-engaging tongue housed within the recess and having a face shaped to engage the obliquely-disposed wall, the free end of said tongue being arranged to be engaged by an adjusting-tool.

2. In combination, a nut having a transversely-extending recess formed in its inner face, said recess having an obliquely-disposed wall that extends from the juncture of the inner face of the nut with one of its wrench-engaging faces, and a pivoted tongue housed within the recess and having its free end shaped for engagement by an adjusting-tool, such tongue having a depending lug or finger for engaging a grooved bolt, the tongue having a face shaped to engage the obliquely-disposed wall.

3. In a nut-lock, a grooved bolt, a nut having a transversely-extending recess across its inner face, one wall of the recess being oblique with respect to the face of the nut, a locking-tongue housed by the recess and having one end pivoted, the free end of the tongue having a recessed upper edge, and a curved lower face to permit engagement by an adjusting-tool.

In testimony that I claim the foregoing as my own I have hereto affixed my signature in the presence of two witnesses.

HARRY H. HAWLEY.

Witnesses:
ELLSWORTH C. LAWRENCE,
FRED. O'NEIL.